Patented Feb. 3, 1925.

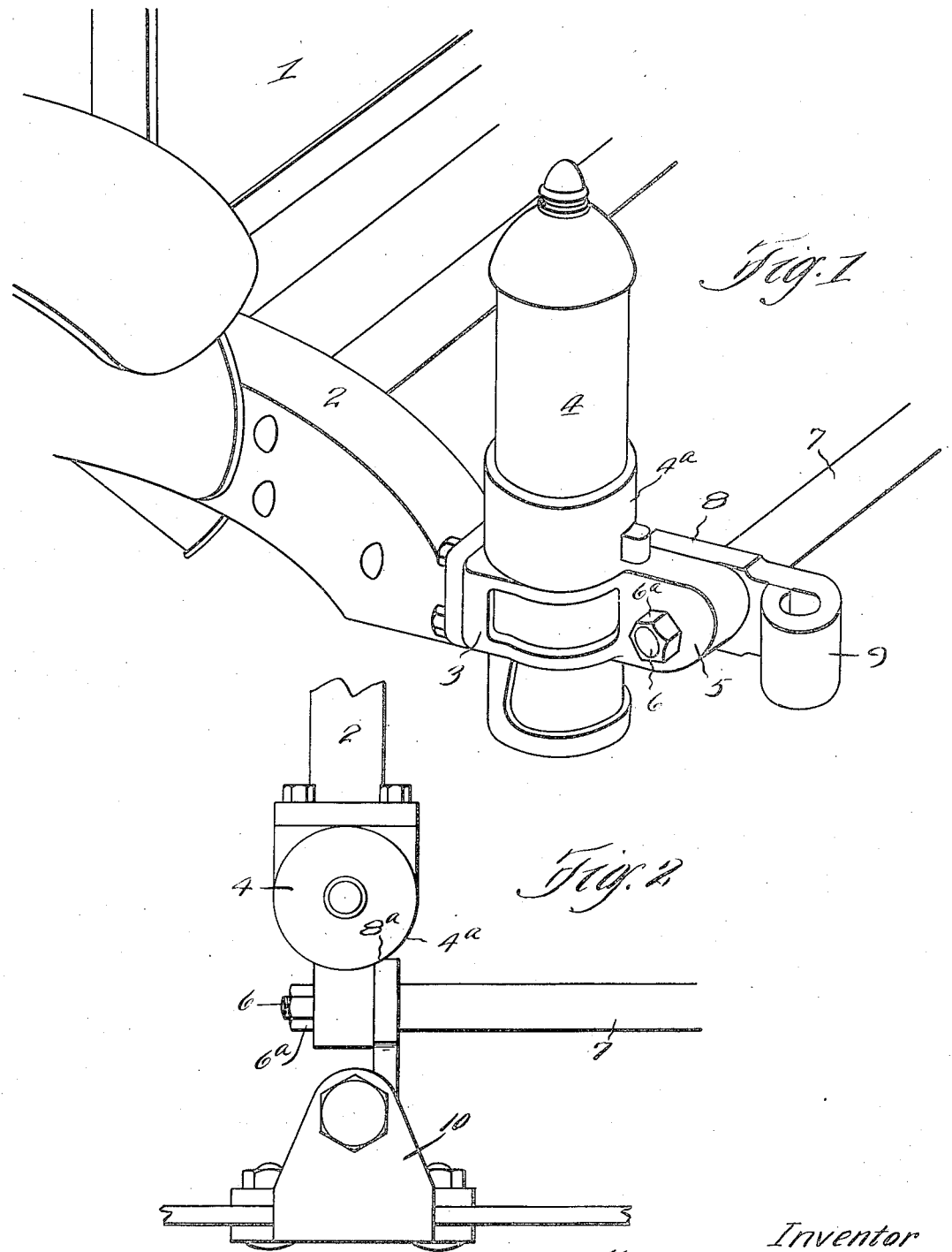

1,525,380

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,467.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from the frames of automobiles, and more particularly to means for accomplishing this object in constructions wherein the vehicles are equipped with fluid shock absorbers, such as exemplified by the "Westinghouse" type.

It is the general purpose and object of the invention to provide bumper-supporting means which may be conveniently applied to such installations and which, when so applied, will not only support the bumpers in an efficient manner, but will enable the shocks due to impact to be effectively distributed to and absorbed by the proper vehicle frame members.

I accomplish the foregoing objects in and through the construction and arrangement of parts illustrated in the drawings forming part hereof, wherein Fig. 1 represents a detail in perspective of the rear end of an automobile having my invention applied thereto; and Fig. 2 a detail in plan of certain of the parts shown in the preceding view and illustrating the manner of supporting a bumper from such parts.

Describing the various parts by reference characters, 1 denotes generally the rear of the body of an automobile and 2 the rear end of one of the side members thereof. Secured to such side member is a bracket 3 supporting a fluid shock absorber 4 of the "Westinghouse" type.

Each of the brackets 3 is provided with a rearward extension 5, the said extensions being connected by a bolt 6, there being a cross tube 7 mounted on said bolt and interposed between the opposed inner faces of the bracket extensions 5 and constituting a spacing member therebetween.

To apply a bumper to a construction such as shown and described, I provide a pair of arms, one of which is indicated generally at 8, the said arms being provided each at its rear or outer end with an eye 9 to which the bumper may be pivotally secured, as by means of clamps, one of which is indicated at 10. The front or inner end of each arm 8 is ground or otherwise shaped, as indicated at 8ª, so as to engage snugly against the forward and inner face of the inner surface of the cylindrical portion 4ª of the bracket in which the cylinder 4 is directly mounted. The cross tube 7 is then shortened by cutting off a length equal to twice the thickness of an arm 8, so that, when the rams 8 are applied to the bolt 6, and before the bolt is tightened by setting up its nut 6ª, the ends of the tube will engage the inner opposed faces of the arms. Then, by setting up the nut 6ª, the bracket projections 5 will be drawn toward each other, the arms 8 will be firmly clamped between the ends of the tube and the bracket projections, while the front or inner end of each arm is forced against the cylindrical supporting member 4ª.

By the construction illustrated and described, simple but firm and effective supporting means are provided for attaching bumpers to vehicles having shock absorber installations of the character shown.

Having thus described my invention, what I claim is:

1. The combination, with a side frame member, of a bracket secured thereto and having a longitudinal extension, the said bracket also having intermediate the ends thereof a cylindrical projection on the inner face thereof, a bumper-supporting arm having a surface conforming to and adapted to fit against the said cylindrical projection, and means for securing the said arm to the said bracket and against the said projection.

2. The combination, with a side frame member, of a bracket secured thereto and having a longitudinal extension, the said bracket also having, intermediate the ends thereof, a projection on the inner face thereof, a bumper-supporting arm having a surface conforming to and adapted to fit against the said projection, and means for securing the said arm to the said bracket and against the said projection.

3. The combination, with the side frame members of an automobile, of a bracket secured to each of the said members and projecting longitudinally therefrom, each bracket having an intermediate convex portion, a bolt connecting the said brackets, a tube mounted on the said bolt, and a pair of bumper-supporting arms mounted on the said bolt and interposed respectively between the ends of the tube thereon and the inner face of a bracket, each of said arms having a portion conforming to the convex portion of its bracket.

4. The combination, with the side member of an automobile, of a bracket member secured to and projecting rearwardly therefrom, the said bracket member having a rearward extension and an intermediate cylindrical portion, a bumper supporting arm, and means for connecting the said arm to the said bracket, the said means comprising a bolt extending through the said bracket and adapted to connect the same to a like bracket on the opposite side of the automobile, and a tube on said bolt, the said bolt extending through the said arm and the said tube adapted to engage the inner face of said arm and to press the said arm against the inner face of the bracket and against the cylindrical portion thereof when the said bolt is set up.

In testimony whereof, I hereunto affix my signature.

WAYNE E. DUNSTON.